United States Patent [19]
Lang

[11] 3,859,595
[45] Jan. 7, 1975

[54] METHOD FOR MEASURING TRAPS IN SEMICONDUCTORS
[75] Inventor: David Vern Lang, Chatham, N.J.
[73] Assignee: Bell Telephone Laboratories, Incorporated, Murray Hill, N.J.
[22] Filed: Dec. 6, 1973
[21] Appl. No.: 422,182

[52] U.S. Cl. ............................ 324/158 D, 324/60 C
[51] Int. Cl. ............................................. G01r 31/26
[58] Field of Search ........ 324/158 D, 158 R, 158 T, 324/60 C

[56] References Cited
OTHER PUBLICATIONS
Carballes et al., "Capacitives Methods. . .;" Solid State Communications; Vol. 9; 1971; pg. 1627-1631.

Primary Examiner—Alfred E. Smith
Assistant Examiner—Ernest F. Karlsen
Attorney, Agent, or Firm—D. I. Caplan

[57] ABSTRACT

In order to measure the trap concentration in the neighborhood of a P-N junction in a semiconductor body, the junction is subjected to a reverse bias voltage upon which is superimposed a positive-going voltage pulse (reducing the bias voltage) sufficient to saturate the traps. After the pulse has terminated, the transient RF capacitance response of the body is measured at two predetermined times; and an electrical signal representative of the difference in the capacitance is then generated. The profile of this difference in capacitance as a function of temperature of the semiconductor body yields the relative concentration of traps as well as their activation energies in the semiconductor.

10 Claims, 4 Drawing Figures

METHOD FOR MEASURING TRAPS IN SEMICONDUCTORS

FIELD OF THE INVENTION

This invention relates to the field of semiconductor apparatus and, more particularly, to methods for testing semiconductor bodies.

BACKGROUND OF THE INVENTION

It is known in the art that certain impurities in a semiconductor give rise to localized energy levels in a semiconductor crystal which can trap either electrons or holes. These localized energy levels lie relatively deep in the forbidden energy bandgap of the semiconductor crystal as compared with the relatively shallow levels responsible for the donor or acceptor levels in the crystal due to other types of impurities. There are basically two types of trap levels in a semiconductor of given conductivity type: those levels which tend to trap majority carriers and those which tend to trap minority carriers.

In the case of gallium phosphide, it is known that oxygen impurities in the gallium phosphide give rise to traps for minority carriers (electrons) in P-type gallium phosphide. In particular, in gallium phosphide doped with zinc as the acceptor impurity, it is also known that zinc-oxygen pairs also give rise to minority carrier traps in P-type gallium phosphide. It is this zinc-oxygen pair type of trap which is responsible for red luminescence in present-day commerical light-emitting diodes of gallium phosphide. In the fabrication of well-controlled and reproducible electroluminescent diodes of gallium phosphide, it is advantageous in the processing of such diodes to be able to measure relatively simply and quickly, at an early stage of manufacture, the concentration of both these traps in the semiconductor. While optical techniques have been developed for detecting traps in semiconductors, such techniques cannot detect nonradiative traps. In a paper by C. T. Sah et al., published in *Applied Physics Letters*, Volume 20, page 193 (1972), capacitance techniques, using temperature scans, are described for measuring trap levels in a semiconductor. However, neither such techniques nor apparently any other capacitance techniques have yet proved capable of measuring or even detecting traps at intermediate (as opposed to deep) energy levels in the forbidden bandgap, such as traps due to zinc-oxygen pairs in gallium phosphide.

It would therefore be desirable to have a simple method which can detect such traps as zinc-oxygen in a gallium phosphide sample, as well as other traps such as oxygen in the gallium phosphide sample, by means of a capacitance technique and with but a single temperature scan. Moreover, it would be desirable to have a technique for detecting a plurality of different traps in a semiconductor using a single temperature scan, which is more sensitive to low concentrations of traps than the temperature scan technique described in the previously mentioned paper by Sah et al.

SUMMARY OF THE INVENTION

In accordance with the invention, a semiconductor P-N junction diode body is subjected to a reverse bias voltage. Initially, an electrical pulse tending to reduce the reverse bias voltage is superimposed upon the reverse bias. The pulse is advantageously of sufficient height and width in order to saturate the traps with charge carriers. For detecting majority carrier traps, the pulse height is advantageously not sufficient to produce forward current through the junction; whereas for detecting minority carrier traps, the pulse height should indeed be sufficient to produce forward current. After cessation of the electrical pulse and as the traps return to thermal equilibrium, the transient RF (high-frequency) capacitance of the body is measured and averaged during two different suitably selected time intervals centered at times $t_1$ and $t_2$ after each pulse, typically by a.c. capacitance bridge techniques. Advantageously, the measurements of the transient are performed in the absence of illumination on the semiconductor body. By high frequency capacitance is meant in the range of about 0.1 Megahertz to about 100 Megahertz. The profile of the differences between the two average transient RF capacitances, $C(t_1) - C(t_2)$, as a function of temperature of the diode, yields undesirable information concerning traps in the neighborhood of the P-N junction. Such a profile contains peaks (local maxima) at various temperatures depending on the traps. More specifically, the height of a peak in the difference profile, $C(t_1) - C(t_2)$, at a particular temperature is proportional to the trap concentration in the neighborhood of the P-N junction of the trap responsible for that peak.

In a specific embodiment of the invention, a gallium phosphide diode to be tested contains a P-N junction. The P-type side of the junction is doped with zinc and oxygen impurities, while the N-type side is doped only with tellurium (donor) impurities. The zinc impurities on the P side of the junction are responsible for making the gallium phosphide P-types, whereas the oxygen impurities produce both oxygen trap levels as well as zinc-oxygen pair type of trap levels on this P side of the junction. The differences in the transient RF capacitances, $C(t_1) - C(t_2)$, at the two predetermined intervals of time are measured subsequent to the application to the junction of a forward-going voltage pulse, which is superimposed upon a reverse bias electrical d.c. voltage. The profile of $C(t_1) - C(t_2)$ as a function of temperature yields the desired information as to the presence and relative concentrations of both oxygen traps and zinc-oxygen pair type traps in the gallium phosphide P-type region in the neighborhood of the junction. Advantageously, the temperature T at which these measurements of capacitance are performed range sufficiently during a single temperature scan so as to embrace all the traps of interest. Specifically, in order to detect and measure the presence of both oxygen traps and zinc-oxygen traps, as well as other traps of as yet unknown origin, the temperatures during a scan range from between about 125K to about 500K.

BRIEF DESCRIPTION OF DRAWING

This invention, together with its features, advantages and objects, may be better understood from the following detailed description when read in conjunction with the drawing in which.

DETAILED DESCRIPTION

Figure 1:
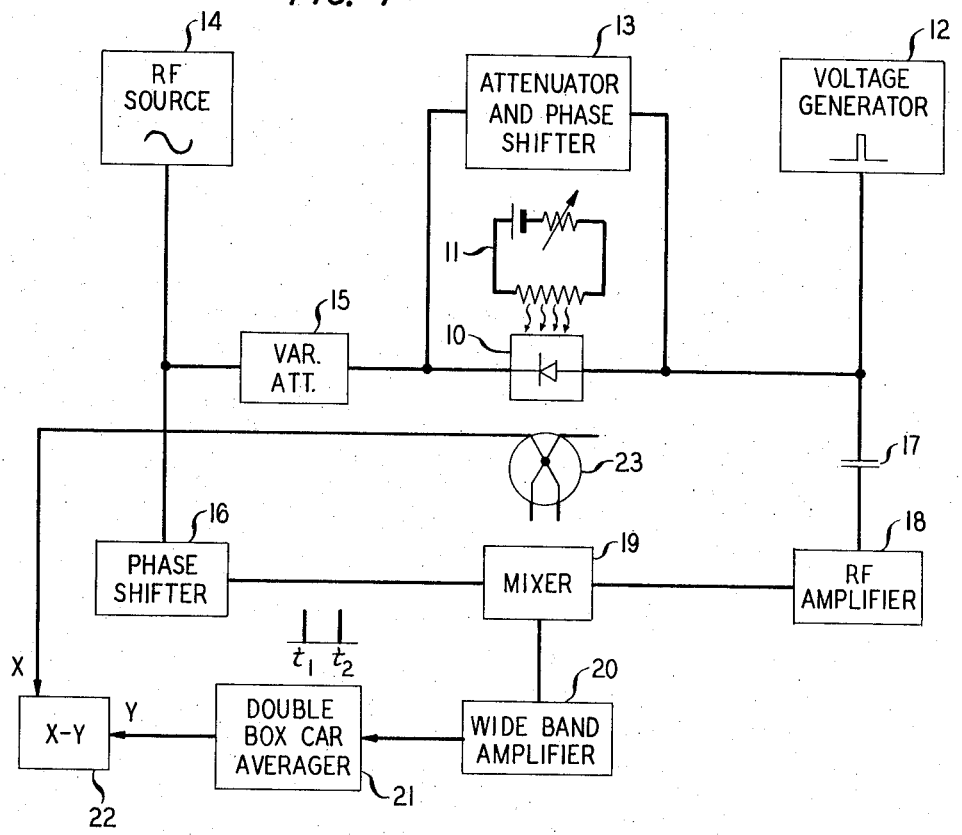
FIG. 1 is a schematic diagram of electrical circuit apparatus for carrying out a sequence of steps for testing a semiconductor sample in accordance with the invention.

As indicated in FIG. 1, a semiconductor diode sample 10 containing a P-N junction to be tested is heated and maintained at a predetermined temperature by means of an auxiliary heating circuit 11. The diode is subjected to a reverse voltage bias, upon which are superimposed voltage pulses, both voltages supplied by the voltage generator 12. The pulse height and width are sufficient to saturate the traps with charge carriers. The diode is placed in parallel electrical relationship with a phase shifting and attenuation network 13 which is adjusted so that minimum RF current flows through the combination of the diode 10 and the network 13 under the influence of an output current from an RF source 14. Thereby, the thermal equilibrium RF capacitance of the sample 10 is offset, and only the RF capacitance transient is detected. A variable RF attenuator 15 is adjusted for optimum signal to noise consistent with reasonably small excursions of the depletion layer width in the diode 10 during RF testing. An RF phase shifter 16 is adjusted so that the capacitive response of the system is maximized. The RF current response of the diode 10 is fed through a bypass capacitor 17 (for d.c. isolation) to an RF amplifier 18. An RF mixer 19 demodulates the thus amplified RF current response to feed only the capacitive component thereof to an amplifier 20. The output of the amplifier 20 is then an amplified signal representative of the instantaneous RF capacitance C of the diode 10. This signal is fed to a double boxcar averager 21 which integrates the signal C over first and second disjoint time intervals centered at $t_1$ and $t_2$, thereby yielding the two time-averaged RF capacitance signals $C(t_1)$ and $C(t_2)$, respectively. The difference signal $C(t_1) - C(t_2)$ is then measured at different temperatures of the diode as controlled by the heating circuit 11.

It is helpful to think of the RF capacitances $C(t_1)$ and $C(t_2)$ as the instantaneous (rather than averaged) values of the RF capacitance of the diode at moments of time centered at $t_1$ and $t_2$, or, speaking more briefly, the RF capacitances at times $t_1$ and $t_2$, respectively. But it should be understood that the actual duration of the time intervals centered at $t_1$ and $t_2$ can be of arbitrary length so long as these intervals do not overlap.

Figure 2:
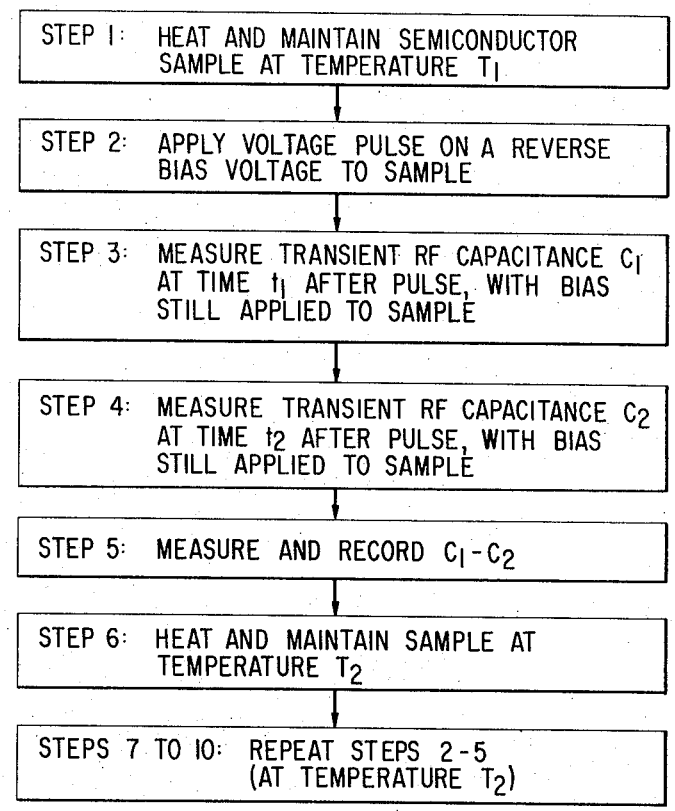
FIG. 2 is a flow chart of the sequence of steps for testing a semiconductor sample in accordance with the invention.

The foregoing steps performed by the apparatus shown in FIG. 1 are indicated in FIG. 2. The difference signal $C(t_1) - C(t_2)$ between the respective transient RF capacitances $C(t_1)$ and $C(t_2)$ is applied to the Y coordinate of an XY recorder 22. The X coordinate of the recorder 22 is controlled by the temperature of the sample semiconductor diode 10 monitored by a thermocouple thermometer 23. Thus, the XY recorder 22 plots the relationship between $C(t_1) - C(t_2)$ versus temperature. Due to the confinement of the depletion region to the neighborhood of the P-N junction, this capacitance C is attributable almost exclusively to this neighborhood, rather than to the bulk material of the diode.

It should be understood that the temperature of the diode 10 can conveniently be continuously (rather than discretely) varied in time, so long as no significant variation in temperature of the sample occurs during the measurements of $C(t_2)$ and $C(t_1)$ for any time period commensurate with the slowest time constant in the system. Thus, the temperature is held substantially constant for each measurement of $C(t_1) - C(t_2)$.

Figure 3:
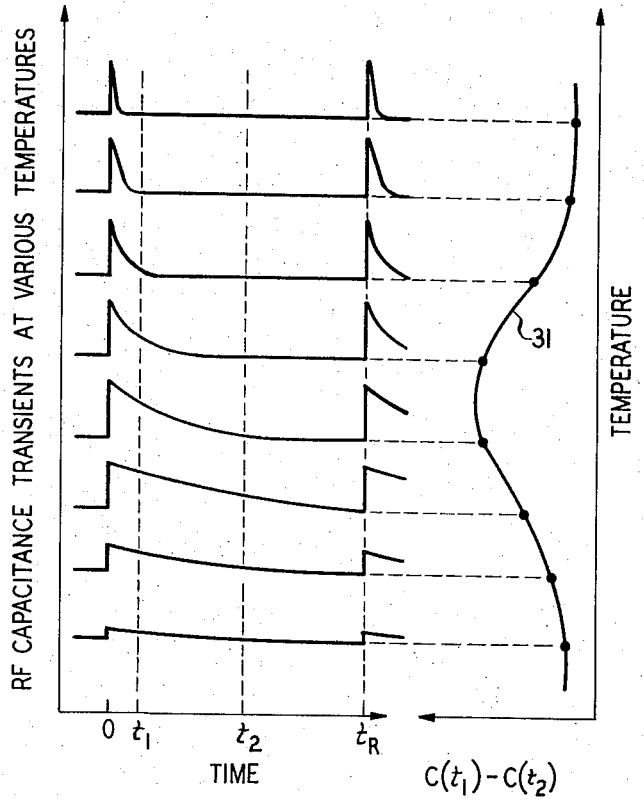
FIG. 3 is a graph useful in explaining the theory of operation of this invention.

As indicated on the left-hand side of FIG. 3, immediately after a pulse is provided by the generator 12, the capacitance decays due to the asymptotic return of the filled and empty trap levels to thermal equilibrium. The rate of decay of the RF capacitance transient is a function of temperature, as indicated on the left-hand side of FIG. 3; so that the differences $C(t_1) - C(t_2)$ for fixed $t_2$ and $t_1$ vary with temperature, as plotted as curve 31 on the right-hand side of FIG. 3. Curve 31 is obtained with the same time intervals centered at the same times $t_1$ and $t_2$ after each pulse.

It should be noted in FIG. 3 that the repetition time is denoted by $t_R$, that is the time between successive voltage pulses (which are indicated as vertical line segments at $t=0$ and $t_R$). At lower temperatures, the capacitance transient does not have sufficient time to decay to thermal equilibrium; consequently, the jumps in capacitance, produced at the moments of the voltage pulses, are of smaller magnitude at lower temperatures.

It should be emphasized that the temperatures, at which the maxima occur in curve 31, depend upon the selection of times $t_1$ and $t_2$ (i.e., the center of the intervals $t_1$ and $t_2$ for finite intervals). For a given ratio of $(t_1/t_2)$, however, the sharpness of these maxima remains relatively similar, but the temperatures at which these maxima occur depend upon the values of $(t_2 - t_1)$. Specifically, for lower values of $(t_2 - t_1)$, the maxima occur at higher temperatures. The lower limit on $t_1$ in any event is the time it takes for the electronics of the system, particularly in the amplifiers 18 and 20, to recover from the voltage pulses of the generator 12. Typically, this lower limit is about 10 microseconds. The upper limit on $t_1$ is of the order of one-tenth the repetition time, $t_R$, otherwise the signal $C(t_1) - C(t_2)$ is always relatively small. The time $t_2$ can vary typically between about twice $t_1$ to slightly below the repetition time, $t_R$. The repetition time $t_R$ is selected sufficiently low for conveniently small duration of the measurements to be made, but $t_R$ should be at least slightly larger than $t_2$ to produce a desired sharpness of maxima (as determined by the ratio, $t_2/t_1$) and at desired temperatures (as determined by the difference, $t_2 - t_1$).

One advantage of the technique in this invention is that the noise background corresponds to essentially the repetition rate which can be as high as several kilocycles ($t_R$ less than 1 millisecond), while the technique described in the above-mentioned paper of Sah et al has a noise background corresponding to much lower repetition rates (less than 10 Hertz) at which amplifiers are significantly burdened with more noise background. Accordingly, the noise improvement of this invention over Sah et al is by a factor of between 2 or 10 or more.

At the sacrifice of the appearance of spurious peaks and spurious steps in the profile, this invention can be practiced with only one value of the transient RF capacitance response $C(t_1)$ and plotting this $C(t_1)$ as a function of temperature, instead of measuring both of $C(t_1)$ and $C(t_2)$ and plotting the difference of $C(t_1) -$ $C(t_2)$ as a function of temperature. In thus practicing this invention with only one value of $C(t_1)$, peaks in the temperature profile are still observed corresponding to the traps provided a capacitor is connected between the amplifier 20 and the double boxcar averager 21, a capacitor is connected in order to a.c. couple the amplifier 20 to the averager 21 thereby to produce these peaks. Advantageously, this capacitor is thus sufficiently large such that the product of its capacitance and the ohmic resistance of the double boxcar averager 21 is at least an order of magnitude larger than repetition time $t_R$. In this way the transient RF capacitance $C(t_1)$ will not be distorted by relatively slow spurious voltage changes in the bias voltage applied across the sample 10 or such spurious changes generated elsewhere in the measurement apparatus itself. Moreover, in selecting the single time interval centered at $t_1$ for the single measurement of $C(t_1)$, the limits on the values of this interval are the same as those discussed above for $t_1$ in the case of the use of the two disjoint time intervals. Even using only the single time interval centered at $t_1$, and profiling $C(t_1)$ as a function of temperature, the technique of this invention is capable of detecting traps of intermediate depth in the energy bandgap, that is, less deep than those observable with the aforementioned technique of Sah et al. and of lower concentration than observable with said technique of Sah et al. Moreover, it should be mentioned that even when using only a single measurement of capacitance $C(t_1)$ at each temperature and scanning the temperature, the aforementioned coupling capacitor between the amplifier 20 and the averager 21 may be omitted, in which case the shape of the resulting profile of $C(t_1)$ as a function of temperature is similar to that as obtained in the technique of Sah et al, but intermediate traps as zinc-oxide can be detected with this invention.

EXAMPLE

In a typical example, by way of illustration only, the sample 10 was a gallium phosphide diode, which had been grown by double liquid phase epitaxy (LPE) on a tellurium doped liquid encapsulated Czochralski (LEC) grown crystal substrate. The substrate had a relatively high net significant donor concentration of the order of $10^{18}$ per cubic centimeter. Upon this substrate, the tellurium doped N-type LPE layer of gallium phosphide was grown with an excess donor impurity concentration of about $7 \times 10^{17}$ per cubic centimeter. Upon this N-type layer, a P-type layer of gallium phosphide was grown, doped with both zinc and oxygen impurities to the extent of about $4 \times 10^{17}$ per cubic centimeter for zinc impurities and about $2 \times 10^{16}$ per cubic centimeter for oxygen impurities, thereby forming a P-N junction. These P and N layers were both grown at about 1,045°C, then annealed at about 600°C for about 5 hours, and at about 500°C for about 9 hours.

The generator 12 was a Systron Donner 110B pulse generator which furnished a reverse voltage bias to the diode 10 as well as controlled voltage pulses superimposed thereon. The rise and fall times of the pulses were of the order of 10 nanoseconds, with pulse widths of the order of 20 nanoseconds to 5 milliseconds. The RF source 14 was a 20 MHz RF oscillator supplying 0.2 volts peak to peak to the diode; and the capacitance of the d.c. isolation capacitor 17 was 200 picofarads. The amplifier 18 was a PAR 115 (Princeton Applied Research). The mixer 19 was a Hewlett Packard RF mixer, and the wideband amplifier 20 was a PAR 113. The double boxcar averager 21 was a PAR 164/162 double boxcar averager set to integrate over the two disjoint time intervals $t_1$ and $t_2$, each interval having a duration of the order of 0.5 milliseconds.

Figure 4:
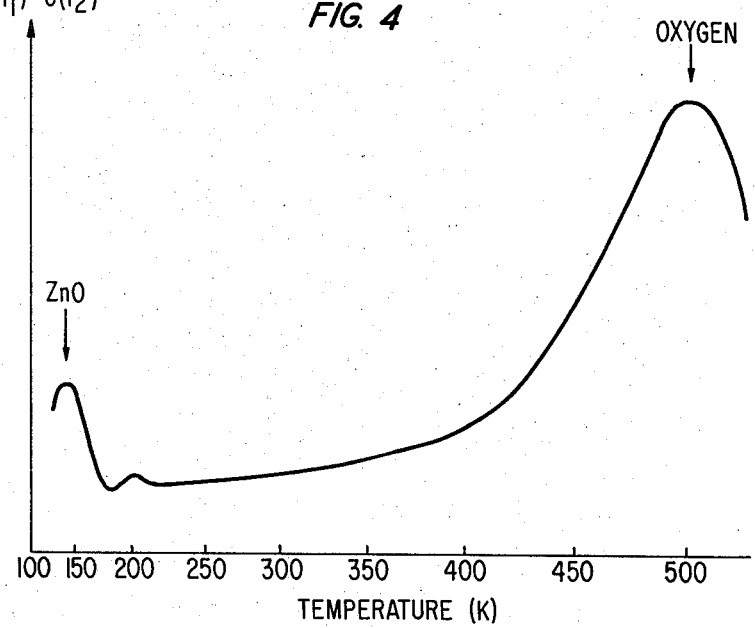
FIG. 4 shows a temperature profile of differential transient RF capacitance response of a P-N junction of gallium phosphide, useful for measuring traps, obtained in accordance with a specific embodiment of the invention.

In operation in accordance with this Example, the generator 12 was set to provide a reverse bias voltage of about 6 volts, together with pulses, of heights about 10 volts (to yield 4 volts forward bias) and widths of about 50 microseconds, superimposed on the reverse voltage bias at predetermined intervals. The polarity of the pulse is advantageously in the sense of decreasing voltage bias. The double boxcar averager 21 was set to detect the capacitance signal output of the amplifier 20, $C(t_1)$ and $C(t_2)$ respectively at times $t_1$ and $t_2$ after termination of the pulses, with $t_1$ equal to about 1 millisecond and $t_2$ about 10 milliseconds. Measurements of the difference, $C(t_2) - C(t_1)$, were recorded in the recorder 22. The temperature was slowly varied from about 125K to about 500K, thereby producing an XY curve in the recorder, indicated in FIG. 4. There were apparently three peaks (relative maxima) in the curve. As indicated in FIG. 4, one peak corresponded to the traps due to ZnO pairs, another peak to the oxygen peak to the oxygen traps, and another due to a trap of unknown origin. For a given trap, the height of such peaks is proportional to the corresponding concentration of that trap in the neighborhood of the P-N junction in the semiconductor. Other gallium phosphide samples have shown even more such peaks due to traps of unknown origin, which may be correlated with luminous efficiency of light-emitting diodes using these samples of gallium phosphide.

While this invention has been described in terms of a specific embodiment, various modifications can be made without departing from the scope of the invention. For example, the semiconductor sample can be semiconductive gallium arsenide, with modification of the voltage pulse supplied by the generator 12 to about 8 volts, with a pulse width of about 1 microsecond, in order to detect traps of as yet unknown origin with activation energies of 0.76eV and 0.44eV, respectively. The sample can also be semiconductive silicon, with pulse heights of about 10 volts, with a pulse width of about 100 microseconds, in order to detect such traps as gold, cobalt, zinc, silver, boron, and sulfur. In general, different pulse heights and widths are best for detecting different traps.

It should be understood that the instantaneous RF capacitances $C(t_1)$ and $C(t_2)$ can be measured by other techniques and electrical signals representative of $C(t_1) - C(t_2)$ can be developed thereby for use in this invention. Also, in addition to P-N junctions, Schottky or other electrical barriers in semiconductors can be tested for traps by using the steps of this invention. Finally, instead of measuring the transient RF capacitance responses of the body to the electrical voltage pulses, transient responses such as electrical current, RF conductance or inductance may also be detected for a pair of disjoint time intervals, centered at $t_1$ and $t_2$, and processed in the same manner as described for the RF capacitance responses.

What is claimed is:

1. A method for testing a semiconductor body containing a P-N junction which comprises the steps of:

a. maintaining the P-N junction under a reverse bias voltage at a first temperature through steps (b) through (d);
b. applying a voltage pulse across the P-N junction in the body superimposed on the reversed bias voltage;
c. developing a first signal proportional to the transient RF capacitance of the junction in the body during a first predetermined time interval after cessation of the pulse;
d. developing a second signal proportional to the transient RF capacitance of the junction in the body during a second predetermined time interval after cessation of the pulse; and
e. developing a third signal proportional to the difference between the first and second signals.

2. The steps recited in claim 1 followed by a repetition of such steps but with the first temperature being changed to a second temperature which is substantially different from the first temperature, all other control parameters being kept substantially the same.

3. The steps recited in claim 2 followed by another repetition of the steps recited in claim 1 with the first temperature being changed to a third temperature which is substantially different from the first and the second temperatures.

4. A method for testing a semiconductor body containing an electrical barrier under a reverse electrical bias which comprises the steps of:
a. maintaining the body substantially at a given temperature during steps (a) through (c);
b. applying an electrical pulse to the body superimposed on the bias;
c. sampling a transient response of the barrier during a first sample time interval after cessation of the pulse and developing an electrical signal representative of the time-averaged transient response of the barrier during the first sample time interval;
d. repeating steps (a) through (c) at a different temperature, all other control parameters being kept substantially the same.

5. A method for testing a body in accordance with claim 4 in which the body is a semiconductor containing a P-N junction under a reverse bias voltage upon which the electrical pulse is superimposed, the transient response being the RF capacitance of the body across the junction.

6. A method for testing a body in accordance with claim 5 in which the transient response is the difference between the RF capacitance during two disjoint time intervals after cessation of the pulse.

7. A method for testing a body in accordance with claim 6 in which the semiconductor is gallium phosphide containing zinc and oxygen impurities which produce traps in the gallium phosphide.

8. A method for testing a semiconductor body for traps, the body containing a P-N junction with the traps in the neighborhood of the junction which comprises the steps of:
a. maintaining the neighborhood of the junction substantially at a first temperature during steps (b) through (c) and subjecting the body to a reverse voltage bias during steps (b) through (d);
b. applying a voltage pulse to the body (superimposed on the bias) sufficient to saturate the traps with charge carriers;
c. developing an electrical signal representative of the difference $C(t_1) - C(t_2)$ of the transient RF capacitance of the body during two disjoint predetermined time intervals $t_1$ and $t_2$ after cessation of the pulse;
d. repeating steps (b) and (c) while maintaining the neighborhood of the junction substantially at a second temperature different from the first.

9. The method recited in claim 8 in which the semiconductor is gallium phosphide.

10. The method of claim 8 in which the traps include zinc-oxygen pairs.

* * * * *